(12) United States Patent
Sezginer et al.

(10) Patent No.: US 9,875,534 B2
(45) Date of Patent: Jan. 23, 2018

(54) TECHNIQUES AND SYSTEMS FOR MODEL-BASED CRITICAL DIMENSION MEASUREMENTS

(71) Applicant: KLA-Tencor Corporation, Milpitas, CA (US)

(72) Inventors: Abdurrahman Sezginer, Monte Sereno, CA (US); Eric Vella, Mountain View, CA (US); Balaji Ganapathy, Union City, CA (US); Yanwei Liu, Danville, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/250,649

(22) Filed: Aug. 29, 2016

(65) Prior Publication Data

US 2017/0069080 A1   Mar. 9, 2017

Related U.S. Application Data

(60) Provisional application No. 62/214,472, filed on Sep. 4, 2015.

(51) Int. Cl.
*G06K 9/00* (2006.01)
*G06T 7/00* (2017.01)
*G06T 7/62* (2017.01)

(52) U.S. Cl.
CPC ............ *G06T 7/0006* (2013.01); *G06T 7/001* (2013.01); *G06T 7/62* (2017.01);
(Continued)

(58) Field of Classification Search
CPC ......... G06T 7/0004; G06T 2207/30164; G06T 2207/10004; G02F 1/133305
(Continued)

(56) References Cited

U.S. PATENT DOCUMENTS 6,516,085 B1   2/2003   Wiley et al.
6,544,699 B1   4/2003   Kim et al.
(Continued)

OTHER PUBLICATIONS

Shishido, Chie et al., "Accurate measurement of very small line patterns in critical dimension scanning electron microscopy using model-based library matching technique", J. Micro/Nanolith. MEMS MOEMS 10(1), Jan.-Mar. 2011, pp. 013010-1 through 013010-10.
(Continued)

*Primary Examiner* — Yosef Kassa
(74) *Attorney, Agent, or Firm* — Kwan & Olynick, LLP

(57) ABSTRACT

A reticle is inspected with an imaging system to obtain a measured image of a structure on the reticle, and the structure has an unknown critical dimension (CD). Using a model, a calculated image is generated using a design database that describes a pattern used to form the structure on the reticle. The model generates the calculated image based on: optical properties of reticle materials of the structure, a computational model of the imaging system, and an adjustable CD. A norm of a difference between the measured and calculated images is minimized by adjusting the adjustable CD and iteratively repeating the operation of generating a calculated image so as to obtain a final CD for the unknown CD of the structure. Minimizing the norm of the difference is performed simultaneously with respect to the adjustable CD and one or more uncertain parameters of the imaging system.

23 Claims, 5 Drawing Sheets

(52) U.S. Cl.
CPC ............... *G06T 2207/10004* (2013.01); *G06T 2207/10056* (2013.01); *G06T 2207/30148* (2013.01)

(58) Field of Classification Search
USPC ............... 382/141, 145, 147, 148, 149, 152; 348/86, 125
See application file for complete search history.

(56) References Cited

U.S. PATENT DOCUMENTS

| | | | | |
|---|---|---|---|---|
| 7,062,346 B2* | 6/2006 | Takagi | ............... | G05B 19/4183 257/E21.525 |
| 7,065,239 B2* | 6/2006 | Maayah | ............... | G06T 7/0004 250/559.22 |
| 7,167,185 B1 | 1/2007 | Yiin et al. | | |
| 7,288,213 B1* | 10/2007 | Charriere | ............. | C07D 251/34 252/182.2 |
| 7,421,358 B2* | 9/2008 | Tuohy | ............... | G05B 23/0221 438/10 |
| 7,466,853 B2* | 12/2008 | Kim | ................... | G01N 21/9501 382/145 |
| 7,596,420 B2 | 9/2009 | Kiers et al. | | |
| 7,625,679 B2* | 12/2009 | Sullivan | ................ | B82Y 10/00 430/22 |
| 8,065,636 B2 | 11/2011 | Ye et al. | | |
| 8,279,409 B1 | 10/2012 | Sezginer et al. | | |
| 9,009,647 B2 | 4/2015 | Ye et al. | | |
| 2006/0234145 A1 | 10/2006 | Watson | | |
| 2006/0236294 A1 | 10/2006 | Saidin et al. | | |
| 2013/0198697 A1 | 8/2013 | Hotzel | | |
| 2014/0086475 A1 | 3/2014 | Daneshpanah et al. | | |
| 2014/0307947 A1 | 10/2014 | Kurada et al. | | |
| 2015/0144798 A1 | 5/2015 | Shi et al. | | |

OTHER PUBLICATIONS

Spence, Chris, "Full-Chip Lithography Simulation and Design Analysis—How OPC is changing IC Design", Proceedings of SPIE vol. 5751, 2005, 14 pgs.

Zou, Y.B. et al., "Model-Based Library for Critical Dimension Metrology by CD-SEM", Microsc. Microanal. 20 (Suppl 3), 2014, pp. 6-7.

"International Application Serial No. PCT/US2016/050000, Search Report dated Nov. 30, 2016", 3 pgs.

* cited by examiner

TECHNIQUES AND SYSTEMS FOR MODEL-BASED CRITICAL DIMENSION MEASUREMENTS

CROSS-REFERENCE TO RELATED APPLICATIONS

This application claims priority under 35 U.S.C. § 119 of prior U.S. Provisional Application No. 62/214,472, filed 4 Sep. 2015, titled "Model-Based CD Measurement" by Abdurrahman Sezginer et al., which application is herein incorporated by reference in its entirety for all purposes.

TECHNICAL FIELD OF THE INVENTION

The invention generally relates to the field of semiconductor metrology, such as reticle metrology. More particularly the present invention relates to a method for measuring dimensions of features on a reticle.

BACKGROUND

Generally, the industry of semiconductor manufacturing involves highly complex techniques for fabricating integrating circuits using semiconductor materials which are layered and patterned onto a substrate, such as silicon. An integrated circuit is typically fabricated from a plurality of reticles. Initially, circuit designers provide circuit pattern data or a design database, which describes a particular integrated circuit (IC) design, to a reticle production system, or reticle writer. The circuit pattern data is typically in the form of a representational layout of the physical layers of the fabricated IC device. The representational layout includes a representational layer for each physical layer of the IC device (e.g., gate oxide, polysilicon, metallization, etc.), wherein each representational layer is composed of a plurality of polygons that define a layer's patterning of the particular IC device. The reticle writer uses the circuit pattern data to write (e.g., typically, an electron beam writer or laser scanner is used to expose a reticle pattern) a plurality of reticles that will later be used to fabricate the particular IC design.

Each reticle or photomask is generally an optical element containing at least transparent and opaque regions, and sometimes semi-transparent and phase shifting regions, which together define the pattern of coplanar features in an electronic device such as an integrated circuit. Reticles are used during photolithography to define specified regions of a semiconductor wafer for etching, ion implantation, or other fabrication processes.

A reticle inspection system may inspect the reticle for defects, such as critical dimension uniformity issues, that may have occurred during the production of the reticles or after use of such reticles in photolithography. Due to the large scale of circuit integration and the decreasing size of semiconductor devices, the fabricated devices have become increasingly sensitive to defects. That is, defects which cause faults in the device are becoming smaller. Accordingly, there is a continuing need for improved inspection techniques for monitoring characteristics of the reticle.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, methods and apparatus for measuring a critical dimension bias on a reticle are disclosed. A reticle is inspected with an imaging system to obtain a measured image of a structure on the reticle, and the structure has an unknown critical dimension (CD). Using a model, a calculated image is generated using a design database that describes a pattern used to form the structure on the reticle. The model generates the calculated image based on optical properties of reticle materials of the structure, a computational model of the imaging system, and an adjustable CD. A norm of a difference between the measured and calculated images is minimized by adjusting the adjustable CD and iteratively repeating the operation of generating a calculated image so as to obtain a final CD for the unknown CD of the structure. Minimizing the norm of the difference is performed simultaneously with respect to the adjustable CD and one or more uncertain parameters of the imaging system.

In a specific implementation, the measured image is comprised of a plurality of intensity values at a plurality of xy locations that correspond to a same plurality of xy locations of the calculated image. In a further aspect, the measured image comprises a plurality of measured images of the structure obtained for a plurality of views for different operating parameters of the inspection tool, and the calculated image is generated to be comprised of a plurality of calculated images for the structure for the plurality of views. In another aspect, the views comprise reflected and transmitted light detection. In a further embodiment, the views comprise different settings for one or more of the following: focus offset, a pupil distribution of the illumination, a polarization state of the illumination, a numerical aperture of collection optics, an aperture shape, a pupil filter setting, or an analyzer setting.

In another example, the computational model of the imaging system includes aberration characteristics that were measured on the imaging system. In another aspect, the norm of the difference between the measured and calculated images is a sum of squares of differences of measured and calculated image pixel values. In an alternative embodiment, the norm of the difference between the measured and calculated images is a sum of absolute values of differences of measured and calculated image pixel values. In another embodiment, the one or more uncertain parameters of the system includes one or more of: focus and illumination intensity. In a specific example, the measured and calculated images each comprise a set of images acquired at multiple views, two views differing by at least one or more imaging parameters that include a reflection or transmission mode, an illumination pupil distribution, an illumination polarization, a collection pupil numerical aperture and shape, a focus setting, and a pupil filter phase and amplitude.

In another example, for a plurality of structures across the reticle, the operations of inspecting, generating a calculated image, minimizing a norm, and defining the unknown critical dimension are repeated for each of the plurality of structures to obtain a plurality of final critical dimensions for the plurality of structures across the reticle thereby generating a critical dimension uniformity (CDU) map. The CDU map is analyzed to determine whether the reticle is defective and is to be repaired or discarded, or whether the reticle is to be used to fabricate a semiconductor wafer.

In an alternative embodiment, the invention pertains to an inspection system for measuring a critical dimension bias on a reticle. The system includes illumination optics for generating and directing an incident beam onto the reticle and output optics for detecting actual images from the reticle in response to the incident beam. The system further includes at least one memory and at least one processor that are configured to initiate one or more of the above described operations. In other embodiments, the invention pertains to computer readable media having instructions stored thereon for performing at least some of the above described operations.

These and other aspects of the invention are described further below with reference to the figures.

DETAILED DESCRIPTION OF EXAMPLE EMBODIMENTS

Figure 1:
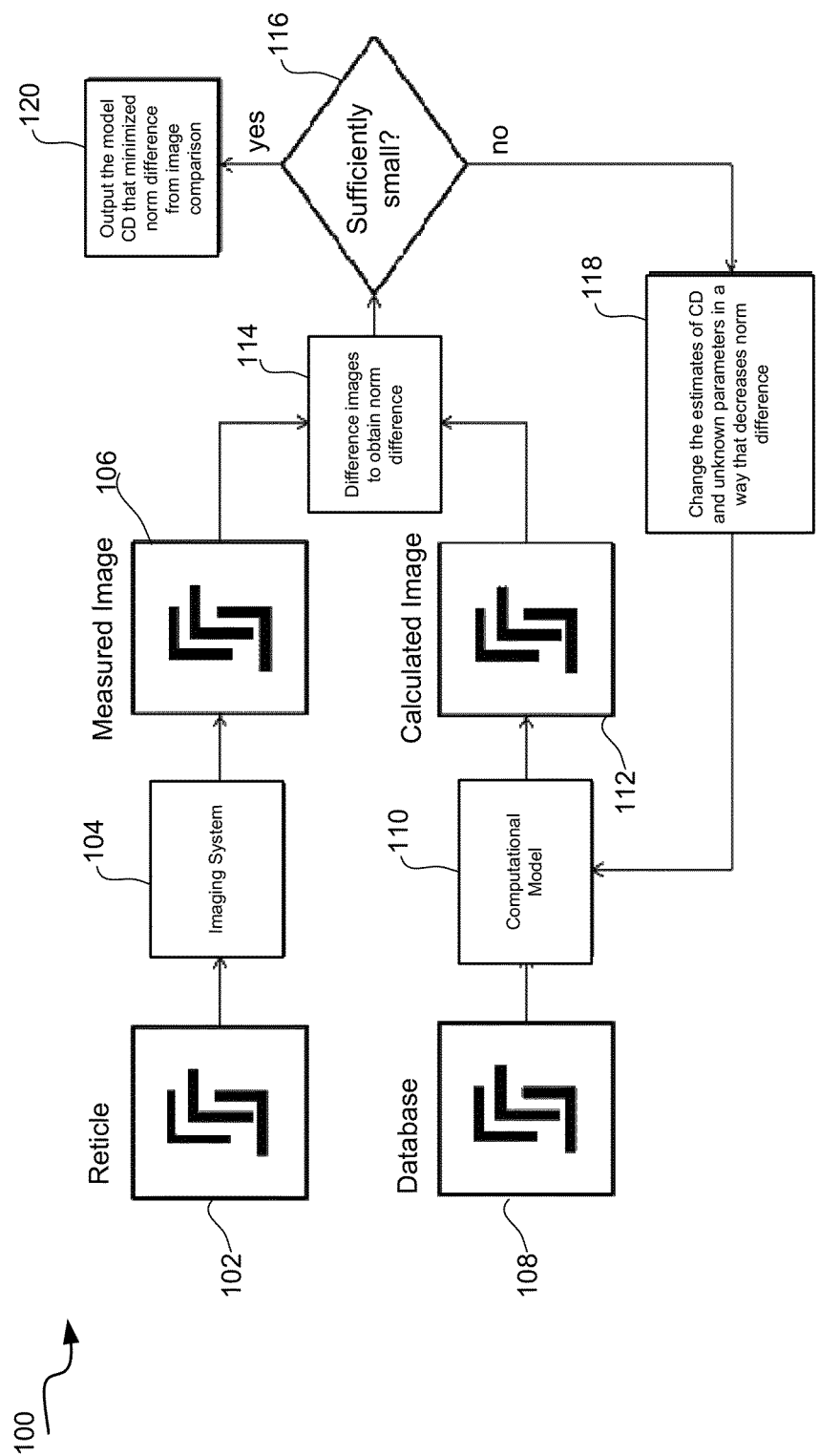
FIG. 1 is a flow diagram of a critical dimension (CD) measurement process in accordance with one embodiment of the present invention.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to these specific embodiments.

Certain embodiments of the present invention provide techniques and systems for inspecting a reticle to detect defects or, more specifically, variations in characteristics, such as critical dimension (CD), of reticle features. Although the following example embodiments are described with respect to a reticle, any suitable type of sample (e.g., wafer) may be monitored using such techniques or systems. Additionally, the following example embodiments can be applied to the monitoring of other sample characteristics, besides CD variation, such as height uniformity, sidewall angle uniformity, surface roughness uniformity pellicle transmissivity uniformity Quartz transmissivity uniformity, etc.

The terms "reticle" generally includes a transparent substrate, such as glass, borosilicate glass, quartz, or fused silica having a layer of opaque material formed thereon. The opaque (or substantially opaque) material may include any suitable material that completely or partially blocks photolithographic light (e.g., deep UV). Example materials include chrome, molybdenum silicide (MoSi), tantalum silicide, tungsten silicide, opaque MoSi on glass (OMOG), etc. A polysilicon film may also be added between the opaque layer and transparent substrate to improve adhesion. A low reflective film, such as molybdenum oxide ($MoO_2$), tungsten oxide ($WO_2$), titanium oxide ($TiO_2$), or chromium oxide ($CrO_2$) may be formed over the opaque material.

The term reticle refers to different types of reticles including, but not limited to, a clear-field reticle, a dark-field reticle, a binary reticle, a phase-shift mask (PSM), an alternating PSM, an attenuated or halftone PSM, a ternary attenuated PSM, and a chromeless phase shift lithography CPL mask. A clear-field reticle has field or background areas that are transparent, and a dark-field reticle has field or background areas that are opaque. A binary reticle is a reticle having patterned areas that are either transparent or opaque. For example, a photomask made from a transparent fused silica blank with a pattern defined by a chrome metal adsorbing film can be used. Binary reticles are different from phase-shift masks (PSM), one type of which may include films that only partially transmit light, and these reticles may be commonly referred to as halftone or embedded phase-shift masks (EPSMs). If a phase-shifting material is placed on alternating clear spaces of a reticle, the reticle is referred to as an alternating PSM, an ALT PSM, or a Levenson PSM. One type of phase-shifting material that is applied to arbitrary layout patterns is referred to as an attenuated or halftone PSM, which may be fabricated by replacing the opaque material with a partially transmissive or "halftone" film. A ternary attenuated PSM is an attenuated PSM that includes completely opaque features as well.

In general, the opaque, absorbing, partially opaque, phase-shifting material is formed into pattern structures that are designed and formed with critical dimension (CD) widths, which also results in clear spaces between the structures that also have a CD. A particular CD value may generally affect how a particular reticle feature is transferred to the wafer in the photolithography process, and such CD is chosen to optimize this transfer process. Said in another way, if a certain reticle feature's CD value is within a specified CD range, such CD value will result in fabrication of a corresponding wafer feature that allows proper operation of the resulting integrated circuit, as intended by the circuit designer. Features are typically formed with minimum dimensions that also result in operational circuits so as to conserve integrated chip area.

A newly fabricated reticle may include CD (or other film or pattern characteristic) defect issues. For example, the reticle may have defective CD regions, such as mask-writer swath-errors. A reticle may also become damaged over time in a number of different ways. In a first degradation example, the photolithographic exposure process may result in physical degradation of the opaque material of the reticle. For instance, a high power beam, such as a high powered deep ultra violet (UV) beam at 193 nm, that is used on the reticle may physically cause damage to the opaque material on the reticle. Damage may also be caused by other wavelengths, such as a 248 nm UV beam. In effect, the UV beam can physically cause the opaque patterns on the reticle to slump, causing the features to flatten. As a result, opaque features may have significantly larger CD widths, as compared to original CD widths, while the spacing between such opaque features may have a much smaller CD width, as compared with the original CD width. Other types of CD degradation may be caused by chemical reactions between the reticle features (MoSi) and the exposure light, cleaning processes, contamination, etc. These physical effects can also adversely affect the critical dimensions (CD's) of the reticle over time.

As a result of this degradation, the feature CD values may have significantly changed so as to affect CD uniformity across the reticle and adversely affect wafer yield. For instance, mask feature widths in portions of the mask may be significantly larger than the original line width CD. For instance, there may be a radial pattern of CD non-uniformity, with the center of the reticle having different CD than the edges of the reticle.

Certain previous CD measurement techniques utilize a digitized image of the object under test. An intensity threshold is applied to the image, and the locations of edges at which the intensity image equals the threshold are found. The distance between these edges may then be determined. In one implementation, the threshold is selected to be the iso-focal threshold such that changing focus minimally perturbs the measurement.

This dimension measurement technique, which is performed on the reticle image, is sensitive to errors in the intensity scale and aberrations in the imaging system. Additionally, an exact iso-focal condition is not always attainable. Interaction of illumination with the reticle is also not accurately accounted. Thus, the geometric or physical meaning of the measured distance is unclear, especially for an arbitrary 2-dimensional pattern, resulting in unacceptable levels for CD measurement accuracy.

In certain techniques of the present invention, the object under test (e.g., reticle) is illuminated and its image is formed on a detector. The output of the detector may then be digitized and further processed. The critical dimension (CD) of a feature may then be measured by iteratively fitting images calculated by a computational model to the image acquired (measured) by the imaging system. Although the reticle has patterns that are at the resolution limit of the inspection tool, the model can simulate images to be comparable to such actual images obtained from the reticle.

FIG. 1 is a flow diagram of a reticle inspection process 100 in accordance with one embodiment of the present invention. As shown, a reticle image 102 may be provided to an imaging system 104 to obtain a reticle 106. The reticle was fabricated based on a design database. The reticle image 106 may be obtained using any tool, such as Teron 640 available from KLA-Tencor Corp. of Milpitas, Calif. The reticle image 106 is typically a blurred image obtained in the image or field plane (e.g., a blurred replica of the reticle pattern). Although the following description pertains to a single reticle structure and its corresponding image(s) and simulated image(s), the techniques can be applied to multiple images of multiple structures on the reticle.

Each reticle image (calculated and measured) will also be comprised of a plurality of intensity values at a plurality of xy coordinates or an array of intensity pixels. One or more reticle images may also be obtained under various imaging conditions or "views" or "v" settings, such as detection of reflected and/or transmitted light from the reticle, a particular wavelength, focus offset, the pupil distribution of the illumination, the polarization state of the illumination, the numerical aperture of the collection optics, aperture shape, pupil filter setting, analyzer setting, etc. For example, different phase and amplitude settings may be set for different positions in the illumination and/or collection pupil. In another example, different S or P polarization may be selected. In sum, various combinations of illumination and/or collection settings of the inspection tool can be used to obtain the reticle image.

Thus, each set of reticle images will correspond to a plurality of intensity values at a plurality of different x,y and one or more view settings. When multiple views are used to obtain multiple reticle images, the set of reticle images can be represented as a set of intensity values that are indexed by different x,y,v values. The reticle image from a single view provides a rich source of data (i.e., intensity values at different reticle locations), while images obtained at different views provides even more data for the processing techniques for finding CD as described further below.

The design database 108 for the same pattern/structure on the reticle that is being imaged may also be fed into a computational model 110 to generate a calculated reticle image 112 for such pattern/structure. The design database would typically be available in a die-to-database defect inspection, for example, which is performed immediately after the reticle is fabricated. The design database 108 includes a description of the patterns and structures on the reticle 102. In one example, a database (DB) image with grayscale values is rasterized from the database polygons or two dimensional shapes. Such database is usually transmitted by a file in OASIS, MEBES, or GDSII format.

The model may be configured in any suitable manner so as to generate different calculated images for a given set of structure/pattern and inspection tool parameters, including constant and one or more adjustable parameters (e.g., CD). A modelled image clip of each line feature and its surrounding neighbors or background may be generated. In general, the model simulates the optical properties of a particular imaging tool that will be used on the actual reticle to obtain reticle images.

Each modelled image clip is preferably generated based on a particular target structure and its surrounding neighbors within a particular distance from such particular target. The size of the clip depends on the target and the distance away from such target within which any neighbor structures may possibly or likely have an optical effect on the resulting modeled target image. For example, the image clip may be sized to include the feature and any neighbor features or an area that is within a distance that is 10 times the point-spread-function of the imaging system from the feature. The model will include at least some of the optical effects that would be present in the inspection tool or whatever imaging optical tool that is being modeled. Example models include the database rendering model used in KLA-Tencor's reticle inspection systems, etc.

For instance, a description of the pattern under test on the reticle is input to the model. In general, a description of the structure under test and its surrounding background are typically obtained from the design database and input to the model. That is, the location of a particular structure that is being inspected is used to retrieve the corresponding structure and its surrounding background description from the design database. Other model input parameters for the pattern under test may include the optical properties of reticle materials.

Figure 2:
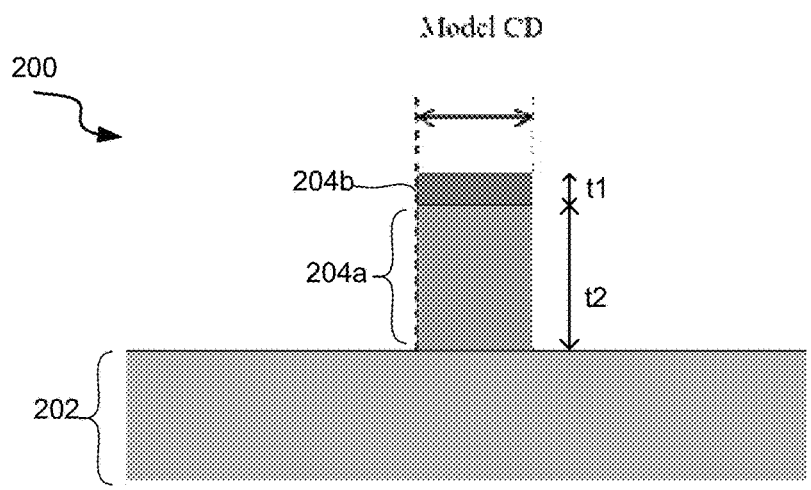
FIG. 2 is a cross section view of a representation of the physical model of a 3-dimensional pattern on the mask.

The model may be configured in any suitable manner so as to generate different calculated images for a given set of pattern parameters, including constant parameters and one or more adjustable parameters, including CD. For instance, a description of the pattern on the reticle is input to the model. Pattern model parameters may include the profile dimensions of the pattern, the optical properties of reticle materials, etc. In one embodiment, the profile of the edges of the pattern etched on the reticle is assumed to be constant. In the simplest implementation, the edges are assumed to be vertical. FIG. 2 is a cross section view of a representation of the physical model of a 3-dimensional pattern 200 on the mask. The mask pattern is etched into a stack of layers deposited on the reticle substrate. As shown, the pattern representation 200 has a first layer 204a and a second layer 204b patterned onto a substrate 202 of the reticle. The real and imaginary parts of the refractive index and thickness of each layer may be input into the computational model. The refractive index and thickness (e.g., t1 and t2) of the un-etched film stack of the actual reticle can be measured by an ellipsometer. The mask pattern will also have an adjustable associated CD.

The optical configuration of the inspection tool may also be modelled. Additionally, the inspection tool's aberration can be characterized and measured periodically and input into the model. For instance, an interferometric technique can be used to measure the inspection tool's aberrations.

Another approach for measuring aberrations using a diagnostic structure is further described in U.S. Pat. No. 9,335,206, issued 10 May 2016 by Qiang Zhang et al, which is incorporated herein by reference in its entirety for all purposes. In one approach, the diagnostic test pattern is designed to diffract EUV light intensity so as to substantially fill the pupil as uniformly as possible. Additionally, diagnostic mask embodiments include a test structure and surrounding background material that results in high contrast between the imaged test structure and imaged background.

The critical lateral dimension of the test pattern of the diagnostic mask may be designed to be comparable to or below the resolution of the projection optics. In one embodiment, the test pattern is equal to or less than a few tens of nanometers (nm). The diagnostic mask may also be designed to support lithographic patterning at such a fine resolution level while providing high optical resolution and contrast when the test structure is imaged under EUV light.

In one embodiment, the diagnostic mask is based on a thin EUV multilayer (ML) reflector design, composed of two alternating low-absorbing materials with high refractive index contrast. In contrast to the reflector seen on a fabrication reticle, which typically includes 40-60 pairs of Mo/Si bilayer, the diagnostic mask includes a ML pillar or pinhole having no more than about 15 or no more than about 10, such as 5, pairs of Mo/Si bilayer. The result of using less than 10 bilayers or pairs of the ML portion is that the bandwidth of the multilayer reflector is significantly increased. Additionally, the thickness or period of the bilayer (e.g., Mo/Si) may be tuned over the range of between about 7.0-7.5 nm, to further flatten out the reflectivity in the angular range of interest.

In general, wave-front aberration can be measured by a phase retrieval method, based on the images captured on diagnostic test structures, using the inspection imaging system, whose wave-front is to be measured. An idealized, non-aberrated image of the diagnostic structure can be calculated and compared to the corresponding measured image to obtain a characterization of the aberration of the inspection system. A phase retrieval technique may be used, such as the technique described in P. Dirksen et al, "Characterization of a projection lens using the extended Nijboer-Zernike approach" Proceedings of SPIE v4691, 1392 (2002), which paper is incorporated herein by reference.

Referring back to the model for forming a calculated reticle image, other model parameters will generally include a description of the inspection tool, as well as such tool's view settings, which may include detection of reflected and/or transmitted light from the reticle, a particular wavelength, focus offset, the pupil distribution of the illumination, the polarization state of the illumination, the numerical aperture of the collection optics, aperture shape, pupil filter setting, analyzer setting, etc. Model reticle images may be generated for the views that were used to obtain the actual measured reticles images.

In general, the computational model calculates how the illumination interacts with a particular pattern or structure that is etched on the reticle. For this purpose, the Rigorous Coupled Wave Analysis (RCWA) method can be used. Other methods such as Finite-Difference Time-Domain (FDTD), boundary integral equation, volume integral equation, finite element method (FEM), spectral element method, Kirchhoff Approximation are possible.

The computational model has adjustable parameters which are not precisely known. The most significant adjustable parameter is the quantity that is to be determined/measured, the critical dimension (CD). The design database includes patterned structures having intended dimensions, and the actual reticle has corresponding patterned structures that may deviate from such intended dimensions, e.g., by a CD bias. The dimensions of the design database pattern structures can be adjusted and then used to calculate the resulting image for such adjusted pattern.

In addition to CD, the model can have other adjustable parameters. For instance, some parameters of the imaging system, such as focus and light intensity, may fluctuate and, therefore, may be uncertain. Other model parameters may be known "well enough" or have a certain high degree of certainty. When more parameters are adjusted, the results become less repeatable and less precise. Accordingly, the number of adjustable parameters that are selected for model is balanced against the goal of achieving accurate CD results. Thus, the model parameters are measured and known as much as possible. In one embodiment, only the CD and focus are adjusted in the model to generate the model image.

When the effect of the uncertain parameters on the image is sufficiently distinct from the effect of CD, the uncertain imaging parameters are adjusted simultaneously with CD in order to fit the calculated and measured images. In an embodiment, the adjustable parameter is a uniform bias $\Delta CD$ so that all edges of all shapes in the reticle database pattern are biased by $\Delta CD$.

Referring back to the process of FIG. 1, the measured image 106 and the calculated image 112 produced by the model are differenced in operation 114 and a norm of the difference is calculated. By way of example, a norm of the difference of images is the sum of squares of pixel by pixel image. Other norms of difference of images include weighted sum of squares, sum of absolute values, or the maximum of absolute values of pixel by pixel image differences.

An iterative process may then be performed so as to minimize one or more difference quantities. As shown, it may be determined whether the norm of the difference is sufficiently small in operation 116. If the quantity is not suitably small, the estimates of CD and the other one or more unknown parameters may be changed in a way that decreases such norm of the difference in operation 118. When the norm of the difference is sufficiently small, the model CD that resulted in the minimized norm of the difference from the image comparison may then be output in operation 120. This model CD (e.g., as shown in FIG. 2) may then be defined as the actual or measured CD of the corresponding pattern.

In general, the calculated and measured images are fitted to obtain a norm of the difference. This fitting process can be performed by minimizing a norm of the difference of the calculated and measured images. Examples of suitable norms that work well include weighted $l_1$ and $l_2$-norms as in the following:

$$\|I_{calc} - I_{meas}\|_1 = \qquad \text{Equation 1}$$
$$\sum_v \sum_x \sum_y |I_{calc}(x, y, v) - I_{meas}(x, y, v)| w(x, y, v)$$

$$(\|I_{calc} - I_{meas}\|_2)^2 = \qquad \text{Equation 2}$$
$$\sum_v \sum_x \sum_y (I_{calc}(x, y, v) - I_{meas}(x, y, v))^2 w(x, y, v)$$

The use of $l_2$-norm (sum of squared errors) allows algorithms that minimize the $l_2$-norm to run faster. The summations for each pattern structure may be taken over multiple image pixels x,y and views indexed by v.

If the model has input that precisely matches the actual parameters of the measured image, such as CD, then the above quantities of Equation 1 and 2 will be zero. If the CD that is selected as input to the model differs from the actual CD of the imaged structure, the quantity will be a positive number for Equations 1 and 2.

The quantity w(x,y,v) is a positive weight that places relative values for different sets of pixels and views. Specific weights may be determined for certain locations and views based on the precision of the image. More noisy views or parts of the image receive smaller weights.

Calculated images may be fitted to the measured images for a single view or multiple views as illustrated for Equations 1 and 2. A view refers to a particular imaging condition, such as images formed by reflected or transmitted light. Views can differ by one or more of: detection of reflected and/or transmitted light from the reticle, a particular wavelength, focus offset, the pupil distribution of the illumination, the polarization state of the illumination, the numerical aperture of the collection optics, aperture shape, pupil filter setting, analyzer setting, etc.

When more than one view is used, the measured images of multiple views may be fitted simultaneously with one physical model having a single adjustable CD parameter. Multiple views better constrain the adjustable CD and reduce the CD measurement uncertainty.

In one approach, reflected and transmitted images are fitted simultaneously. In one example, there is only one adjustable CD parameter and only one focus parameter that are common to reflected and transmitted images. In another method, two transmitted images with known focus offset are fitted simultaneously. In this example, there is only one adjustable CD parameter and only one focus parameter that needs to be adjusted.

In order to determine CD, a norm expression of the differences between the model and measured images may be minimized for a particular CD in any suitable manner. Methods of minimizing an expression such as Equation 2 are well known. In a specific implementation, minimization may be achieved by the following:

$$\min_{CD,p} \sum_v \sum_x \sum_y (I_{calc}(x, y, v, CD, p) - I_{meas}(x, y, v))^2 \qquad \text{Equation 3}$$
$$w(x, y, v)$$

The minimization of Equation 3 is with respect to CD and p. The latter quantity, p, is the array of uncertain parameters of the imaging system. The uncertain parameters can include focus and illumination intensity, by way of examples.

In an alternative embodiment, a maximum a posteriori probability (MAP) estimation may be used. Application of MAP to calculated and measured reticle images can be expressed as Equation 4:

$$\min_{CD,p} \left\{ \sum_v \sum_x \sum_y \frac{(I_{calc}(x, y, v, CD, p) - I_{meas}(x, y, v))^2}{\sigma^2(x, y, v)} + \sum_i \frac{(p_i - E(p_i))^2}{\sigma^2(p_i)} \right\}$$

$\sigma(x,y,v)$ is the uncertainty in the intensity measurement at pixel(x,y) in view v, and $p_i$ is the $i^{th}$ uncertain parameter of the imaging system. For example, $p_1$ is focus and $p_2$ is light intensity. $E(p_i)$ is the expected value of $p_i$; $\sigma(p_i)$ is the uncertainty in $p_i$. Each quantity can be weighted inversely by its uncertainty. The uncertainty for each uncertain parameter may be determined from the design tolerances of the imaging instrument or by measuring samples of the uncertain parameter and calculating the variance of the samples. This weighting technique can correctly set the relative importance of the terms in the expression Equation 4 above.

The most general formulation of MAP includes minimizing the probability distribution function of unknown parameters given the observation or pdf (unknown parameters|observations). This formulation reduces to the Equation 4 above if all measurement errors and unknown parameters are Gaussian distributed and if every quantity is statistically independent.

Figure 3:
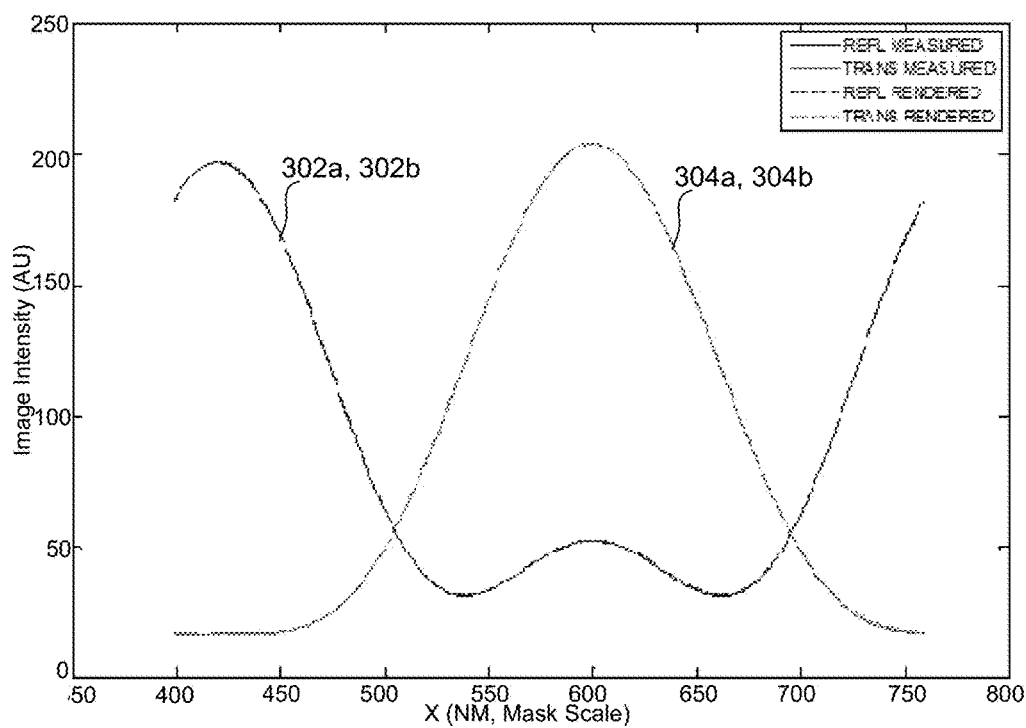
FIG. 3 is a graph of the results from performing a regression analysis between calculated and measured reticle images in accordance with one embodiment of the present invention.

Certain embodiments of the present invention allow the entire image to be used for determining the CD according to a maximum likelihood estimation method. Old methods only use the part of the image with respect to a threshold. The above-described techniques do not need to use a threshold. FIG. 3 is a graph of the results from performing a regression analysis between calculated and measured reticle images in accordance with one embodiment of the present invention. FIG. 3 corresponds to actual data and shows that the model output closely matches the actual image. That is, the reflected intensity data (302a) that is measured for a line structure precisely matches the calculated (or rendered) reflected intensity data (302b) for such line structure. Likewise, the transmitted measured intensity data (304a) closely matches the transmitted rendered intensity data (304b). Thus, one common CD results in matching model and actual intensity data for both reflected and transmitted views. Accordingly, since a same CD result is obtained for different view parameters for a same reticle structure, the technique appears to provide an accurate mechanism for finding CD bias.

The CD bias results can be combined to form a CD uniformity (CDU) map for the entire reticle. A CDU map may be then be analyzed to determine whether the reticle is within specifications as further described herein. Embodiments of a CDU map can take any suitable form. For example, a CDU map can be represented textually as a list of average CD variation values for each area of the reticle. Each average CD variation value may be listed alongside corresponding reticle area coordinates. A CDU map can also be represented by a metric such as the standard deviation or variance of the grid point difference values. Alternatively or additionally, a CDU map may be represented visually so that different CD variation values or ranges are shown as different visual ways, such as differently colored reticle areas, different bar graph heights, different graph values, or 3-dimensional representations, etc. A CDU map can be represented with different grid point sampling sizes or by fits to different functional forms such as a polynomial fit or a Fourier transform.

These CDU maps may be important for a semiconductor chip maker to understand the process window that will result from the use of the reticle. A CDU map may allow a chip maker to determine whether to use the reticle, apply compensation for the errors in the lithography process, or improve fabrication of a reticle so as to form an improved next reticle. A CDU map may be generated and analyzed for a newly fabricated reticle so as to detect fabrication defective areas or performed on a reticle that has been used one or more times in a photolithography process so as to monitor features changes and/or detect degradation.

Figure 4:
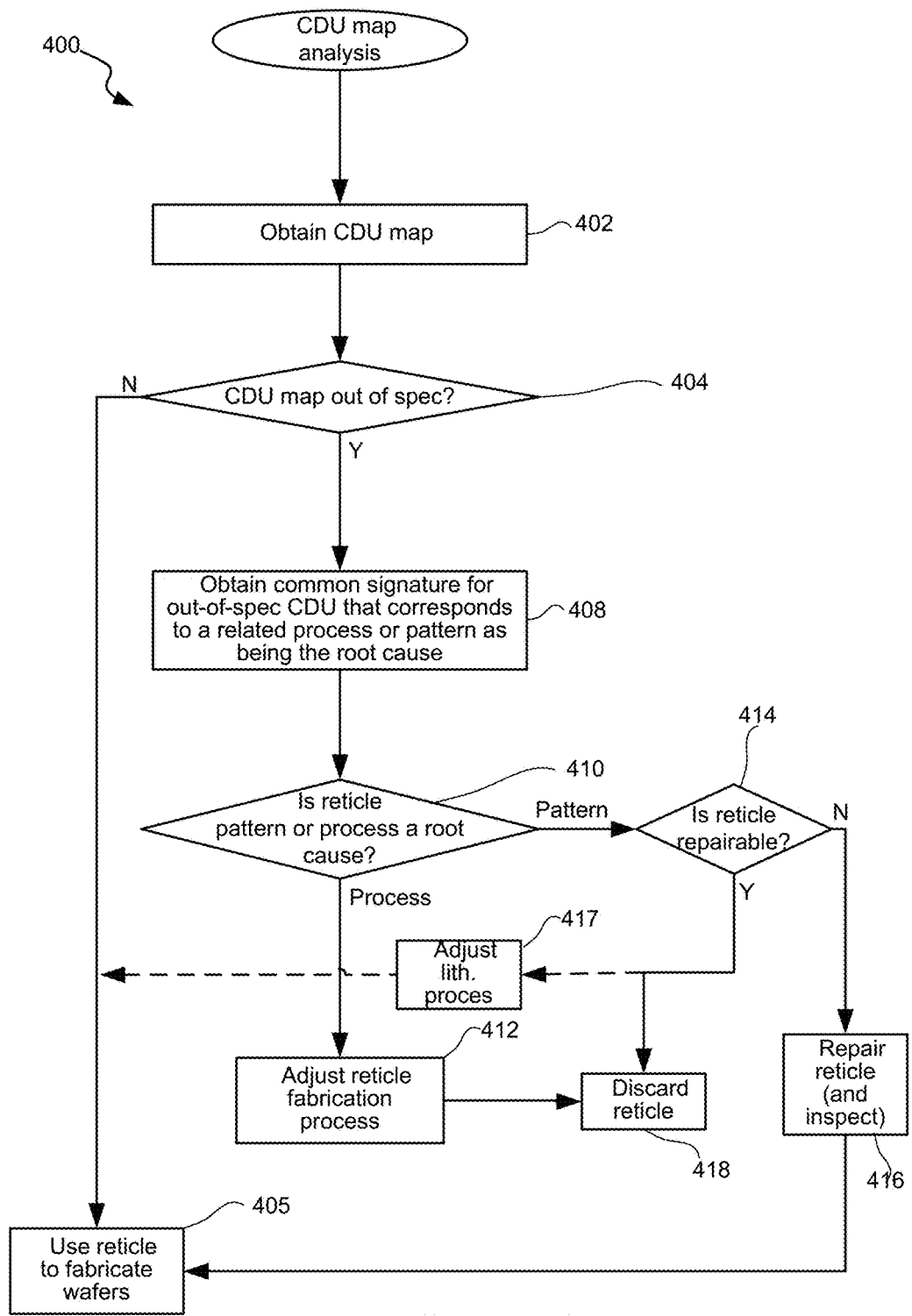
FIG. 4 is a flow chart illustrating a CD uniformity (CDU) map analysis procedure in accordance with one embodiment of the present invention.

FIG. 4 is a flow chart illustrating a CDU map analysis procedure 400 in accordance with one embodiment of the present invention. Initially, a CDU map may be obtained in operation 402. For instance, a CDU maps is obtained by performing the CD bias determining process of FIG. 1 for multiple pattern/structures across the reticle.

It may then be determined whether the CDU map is out of specification in operation 404. For instance, it may be determined whether the CDU variation for a particular reticle area is above a predefined threshold. If the CDU variation is not above the predefined threshold, the reticle may then be used to fabricate wafers in operation 405.

If the CDU variation is above the predefined threshold, a common signature for the out-of-specification CDU map that corresponds to a related process or pattern as a root cause may be obtained in operation 408. A CDU map may be used to track problem areas on the reticles, for example, that are caused by reticle fabrication/process issues or degradation of a reticle over time, such as chrome, MoSi, pellicle, cleaning type degradations. In other words, a particular out-of-specification CDU map may have a certain signature that was previously associated with a particular root cause. For instance, previous inspections and analysis of the reticle or reticle process may have uncovered root cause problems and associated CDU signatures.

Referring back to the illustrated example, it may then be determined whether the reticle pattern or process is a root cause in operation 410. For instance, it may be determined whether the CDU map has a signature that has been associated with a particular root cause, such as a dirty pellicle. If the reticle pattern is a root cause, it may then be determined whether the reticle is repairable in operation 414. If the reticle is not repairable, it may be discarded in operation 418 (and a new reticle fabricated). Otherwise, the reticle is repaired in operation 416. For instance, certain defects can be cleaned from the reticle. By way of examples, the pellicle may be cleaned or replaced or extra reticle portions may be etched or removed. After repair, a new inspection may be performed on the repaired reticle and the procedures for generating and analyzing a CDU map may be repeated. If the repaired reticle is within specification, the repaired reticle may then be used to fabricate wafers in operation 405. In alternative example, the lithography process may be adjusted to compensate for the out-of-specification reticle, e.g., by modifying dose or focus, in operation 417 and the new processed used with the reticle in operation 405. If the process for fabricating the reticle is a root cause, on the other hand, the reticle fabrication process may be adjusted in operation 412 (and the reticle is discarded and a new reticle is fabricated).

During inspection, a plurality of images of the reticle may be obtained using an optical inspection tool. During image acquisition, multiple images are obtained for multiple target structures on the reticle. Images may be obtained from individual areas of each die of a set of dies of a reticle. For example, an inspection tool may be operable to detect and collect reflected or transmitted light or both reflected and transmitted light as an incident optical beam scans across (or moves to each image) of the reticle. An incident optical beam may scan across reticle swaths that each comprises a plurality of images. Light is collected in response to this incident beam from a plurality of points or subareas of each image.

The inspection tool may be generally operable to convert such detected light into detected signals corresponding to intensity values. The detected signals may take the form of an electromagnetic waveform having amplitude values that correspond to different intensity values at different locations of the reticle. The detected signals may also take the form of a simple list of intensity values and associated reticle point coordinates. The detected signals may also take the form of an image having different intensity values corresponding to different positions or scan points on the reticle. A reticle image may be generated after all the positions of the reticle are scanned and light is detected, or potions of a reticle image may be generated as each reticle portion is scanned.

Each set of intensity data may be obtained by sequentially scanning images from the reticle in a serpentine or raster pattern. For example, a first swath of the reticle portion is scanned by an optical beam of an optical inspection system from left to right in a positive x direction, for example, to obtain a first set of intensity data. The reticle is then moved with respect to the beam in a y direction. A second swath is then scanned from right to left in a negative x direction to obtain a second set of intensity data. Swaths are sequentially scanned from the bottom row of dies through the top row of dies or vice versa. Alternatively, images of the reticle may be obtained by moving to each individual target area of the reticle.

In one embodiment, the integrated intensity value for each image may be generated based on reflected light, transmitted light, or both as detected during reticle inspections. In one example implementation, the reflected (R) and transmitted (T) values may be combined by (T−R)/2. The reflected signal typically is the opposite sign from the transmitted signal. Hence, subtracting the T and R signals adds the signals together. Since the noise sources are different for T and R, the noise can tend to be averaged out of the combined signal. Other weightings to R and/or T values may be used to generate integrated intensity values for an image with associated benefits. In some cases, R and T signals for particular regions may have a same sign, instead of an opposite sign, which may indicate that the results are inconsistent in the associated regions and may not be trustworthy. Thus, the combination of R and T could be down-weighted in such regions or removed from the computation if insufficiently trustworthy.

Figure 5:
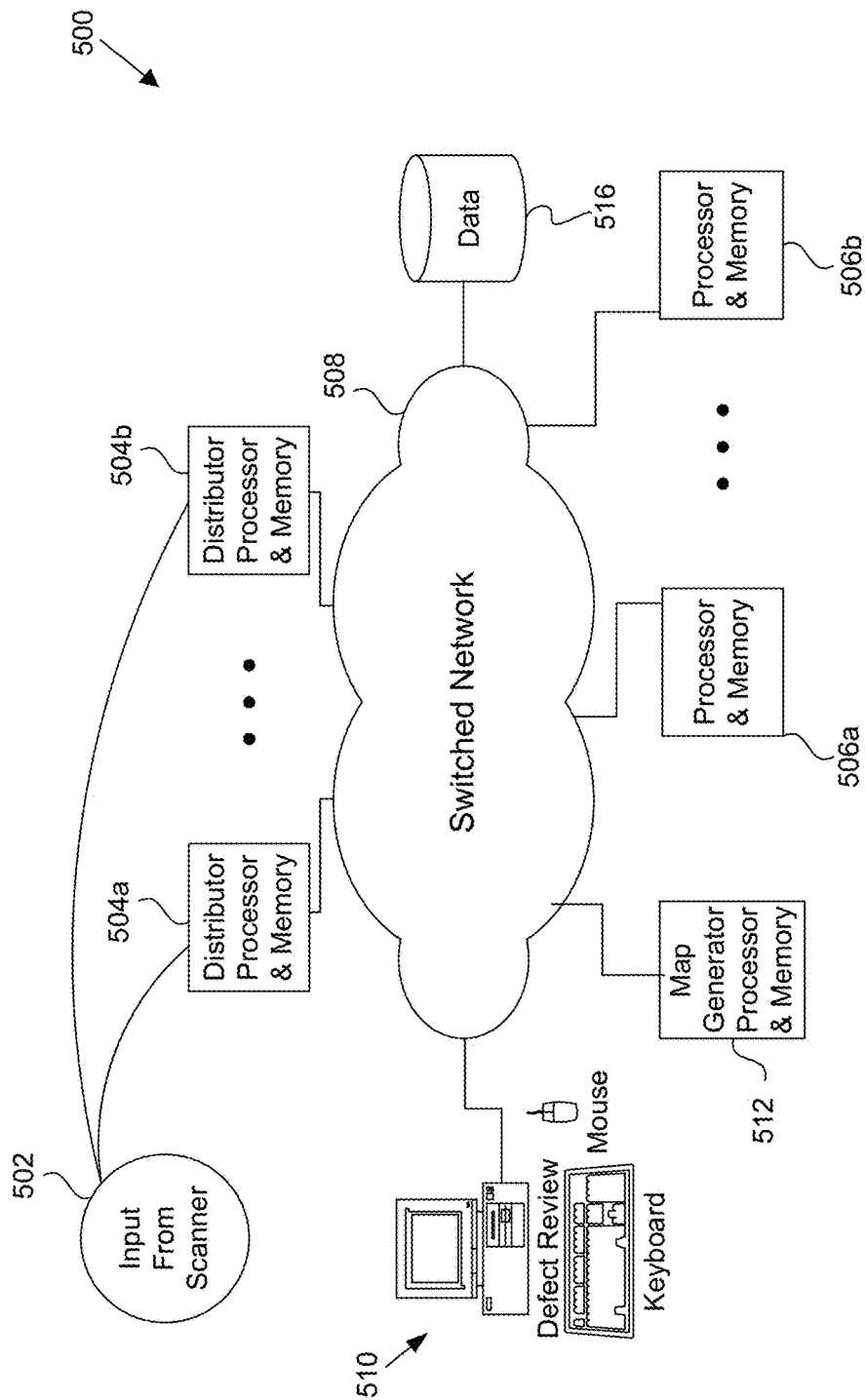
FIG. 5 is a diagrammatic representation of an example inspection system in which techniques of the present invention may be implemented

Techniques of the present invention may be implemented in any suitable combination of hardware and/or software. FIG. 5 is a diagrammatic representation of an example inspection system 500 in which techniques of the present invention may be implemented. The inspection system 500 may receive input 502 from an inspection tool or scanner (not shown). The inspection system 500 may also receive input 502 from a model that models images of the reticle based on the design database (or the system 500 may receive the design data base and then generate such modelled images). The inspection system may also include a data distribution system (e.g., 504a and 504b) for distributing the received input 502, an intensity signal (or image) processing system (e.g., image processors and memory 506a and 506b) for processing specific images or image portions of received input 502, a map generator system (e.g., Map Generator Processor and Memory 512) for generating ΔCD maps, a network (e.g., switched network 508) for allowing communication between the inspection system components, an optional mass storage device 516, and one or more inspection control and/or review stations (e.g., 510) for reviewing the maps. Each processor of the inspection system 500 typically may include one or more microprocessor integrated circuits and may also contain interface and/or memory integrated circuits and may additionally be coupled to one or more shared and/or global memory devices.

The scanner or data acquisition system (not shown) for generating input data 502 may take the form of any suitable instrument (e.g., as described further herein) for obtaining intensity signals or images of a reticle. For example, the scanner may construct an optical image or generate intensity values of a portion of the reticle based on a portion of detected light that is reflected, transmitted, or otherwise directed to one or more light sensors. The scanner may then output the intensity values or image may be output from the scanner.

The reticle is generally divided into a plurality of image portions from which multiple intensity values from multiple points are obtained. The image portions of the reticle can be scanned to obtain this intensity data. The image portions may be any size and shape, depending on the particular system and application requirements. In general, multiple intensity values for each image portion may be obtained by scanning the reticle in any suitable manner. By way of example, multiple intensity values for each image portion may be obtained by raster scanning the reticle. Alternatively, the images may be obtained by scanning the reticle with any suitable pattern, such as a circular or spiral pattern. Of course, the sensors may have to be arranged differently (e.g., in a circular pattern) and/or the reticle may be moved differently (e.g., rotated) during scanning in order to scan a circular or spiral shape from the reticle.

In the example illustrated below, as the reticle moves past the sensors, light is detected from a rectangular region (herein referred to as a "swath") of the reticle and such detected light is converted into multiple intensity values at multiple points in each image. In this embodiment, the sensors of the scanner are arranged in a rectangular pattern to receive light that is reflected and/or transmitted from the reticle and generate therefrom a set of intensity data that corresponds to a swath of images of the reticle.

Intensity values for each image may be obtained using an optical inspection tool that is set up in any suitable manner. The optical tool is generally set up with a set of operating parameters or a "recipe" that is substantially the same for the different inspection runs for obtaining intensity values. Recipe settings may include one or more of the following settings: a setting for scanning the reticle in a particular pattern, pixel size, a setting for grouping adjacent signals from single signals, a focus setting, an illumination or detection aperture setting, an incident beam angle and wavelength setting, a detector setting, a setting for the amount of reflected or transmitted light, aerial modeling parameters, etc.

Intensity or image data 502 can be received by data distribution system via network 508. The data distribution system may be associated with one or more memory devices, such as RAM buffers, for holding at least a portion of the received data 502. Preferably, the total memory is large enough to hold an entire swatch of data. For example, one gigabyte of memory works well for a swatch that is 1 million by 1000 pixels or points.

The data distribution system (e.g., 504a and 504b) may also control distribution of portions of the received input data 502 to the processors (e.g. 506a and 506b). For example, data distribution system may route data for a first image to a first image processor 506a, and may route data for a second image to image processor 506b. Multiple sets of data for multiple images may also be routed to each image processor.

The image processors may receive intensity values or an image that corresponds to at least an image portion of the reticle. The image processors may each also be coupled to or integrated with one or more memory devices (not shown), such as DRAM devices that provide local memory functions, such as holding the received data portion. Preferably, the memory is large enough to hold data that corresponds to an image of the reticle. For example, eight megabytes of memory works well for intensity values or an image corresponding to an image that is 512 by 1024 pixels. The image processors may also share memory.

Each set of input data 502 may correspond to a swath of the reticle. One or more sets of data may be stored in memory of the data distribution system. This memory may be controlled by one or more processors within the data distribution system, and the memory may be divided into a plurality of partitions. For example, the data distribution system may receive data corresponding to a portion of a swath into a first memory partition (not shown), and the data distribution system may receive another data corresponding to another swath into a second memory partition (not shown). Preferably, each of the memory partitions of the data distribution system only holds the portions of the data that are to be routed to a processor associated with such memory partition. For example, the first memory partition of the data distribution system may hold and route first data to image processor 506a, and the second memory partition may hold and route second data to image processor 506b.

The detected signals may also take the form of aerial images. That is, an aerial imaging technique may be used to simulate the optical effects of the photolithography system so as to produce an aerial image of the photoresist pattern that is exposed on the wafer. In general, the optics of the photolithography tool are emulated so as to produce an aerial image based on the detected signals from the reticle. The aerial image corresponds to the pattern produced from the light passed through the photolithography optics and reticle onto the photoresist layer of a wafer. Additionally, the photoresist exposure process for the particular type of photoresist material may also be emulated.

The incident light or detected light may be passed through any suitable spatial aperture to produce any incident or detected light profile at any suitable incident angles. By way of examples, programmable illumination or detection apertures may be utilized to produce a particular beam profile, such as dipole, quadrupole, quasar, annulus, etc. In a specific example, Source Mask Optimization (SMO) or any pixelated illumination technique may be implemented.

The data distribution system may define and distribute each set of data of the data based on any suitable parameters of the data. For example, the data may be defined and distributed based on the corresponding position of the image on the reticle. In one embodiment, each swath is associated with a range of column positions that correspond to horizontal positions of pixels within the swath. For example, columns 0 through 256 of the swath may correspond to a first image, and the pixels within these columns will comprise the first image or set of intensity values, which is routed to one or more image processors. Likewise, columns 257 through 512 of the swath may correspond to a second image, and the pixels in these columns will comprise the second image or set of intensity values, which is routed to different image processor(s).

Figure 6A:
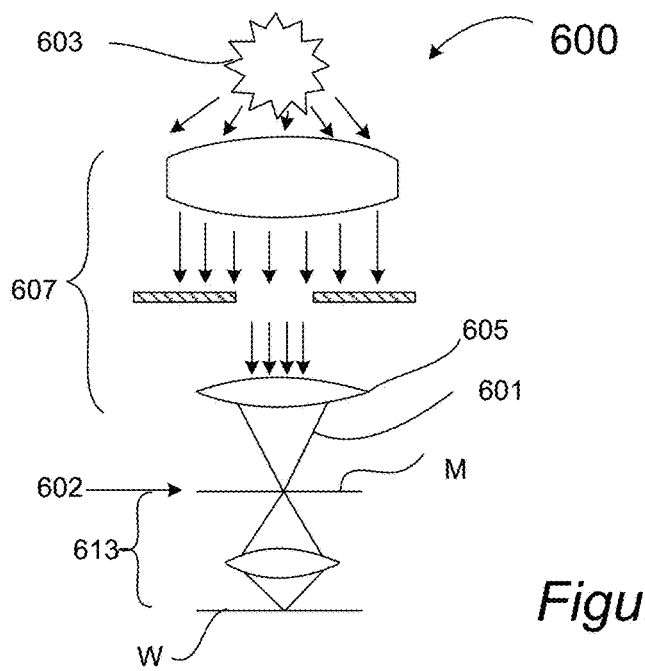
FIG. 6A is a simplified schematic representation of a lithographic system for transferring a mask pattern from a photomask onto a wafer in accordance with certain embodiments.

FIG. 6A is a simplified schematic representation of a typical lithographic system 600 that can be used to transfer a mask pattern from a photomask M onto a wafer W in accordance with certain embodiments. Examples of such systems include scanners and steppers, more specifically TWINSCAN system available from ASML in Veldhoven, Netherlands. In general, an illumination source 603 directs a light beam through an illumination optics 607 (e.g., lens 605) onto a photomask M located in a mask plane 602. The illumination lens 605 has a numeric aperture 601 at that plane 602. The value of the numerical aperture 601 impacts which defects on the photomask are lithographic significant defects and which ones are not. A portion of the beam that passes through the photomask M forms a patterned optical signal that is directed through imaging optics 613 and onto a wafer W to initiate the pattern transfer.

Figure 6B:
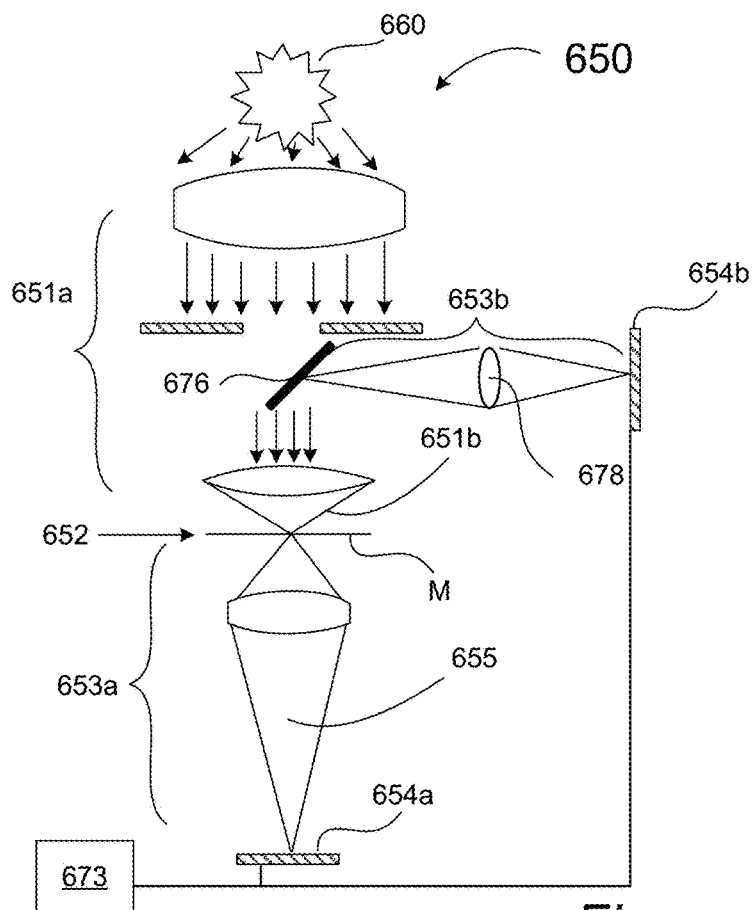
FIG. 6B provides a schematic representation of a photomask inspection apparatus in accordance with certain embodiments.

FIG. 6B provides a schematic representation of an example inspection system 650 that has illumination optics 651a includes an imaging lens with a relative large numerical aperture 651b at a reticle plane 652 in accordance with certain embodiments. The depicted inspection system 650 includes detection optics 653a and 653b, including microscopic magnification optics designed to provide, for example, 60-300× magnification or more for enhanced inspection. For example, the numerical aperture 651b at the reticle plane 652 of the inspection system may be considerable greater than the numerical aperture 601 at the reticle plane 602 of the lithography system 600, which would result in differences between test inspection images and actual printed images.

The inspection techniques described herein may be implemented on various specially configured inspection systems, such as the one schematically illustrated in FIG. 6B. The illustrated system 650 includes an illumination source 660 producing a light beam that is directed through illumination optics 651a onto a photomask M in the reticle plane 652. Examples of light sources include lasers or filtered lamps. In one example, the source is a 193 nm laser. As explained above, the inspection system 650 may have a numerical aperture 651b at the reticle plane 652 that may be greater than a reticle plane numerical aperture (e.g., element 601 in FIG. 6A) of the corresponding lithography system. The photomask M to be inspected is placed on a mask stage at the reticle plane 652 and exposed to the source.

The patterned image from the mask M is directed through a collection of optical elements 653a, which project the patterned image onto a sensor 654a. In a reflecting system, optical elements (e.g., beam splitter 676 and detection lens 678) direct and capture the reflected light onto sensor 654b. Suitable sensors include charged coupled devices (CCD), CCD arrays, time delay integration (TDI) sensors, TDI sensor arrays, photomultiplier tubes (PMT), and other sensors.

The illumination optics column may be moved respect to the mask stage and/or the stage moved relative to a detector or camera by any suitable mechanism so as to scan images of the reticle. For example, a motor mechanism may be utilized to move the stage. The motor mechanism may be formed from a screw drive and stepper motor, linear drive with feedback position, or band actuator and stepper motor, by way of examples.

The signals captured by each sensor (e.g., 654a and/or 654b) can be processed by a computer system 673 or, more generally, by one or more signal processing devices, which may each include an analog-to-digital converter configured to convert analog signals from each sensor into digital signals for processing. The computer system 673 typically has one or more processors coupled to input/output ports, and one or more memories via appropriate buses or other communication mechanisms.

The computer system 673 may also include one or more input devices (e.g., a keyboard, mouse, joystick) for providing user input, such as changing focus and other inspection recipe parameters. The computer system 673 may also be connected to the stage for controlling, for example, a sample position (e.g., focusing and scanning) and connected to other inspection system components for controlling other inspection parameters and configurations of such inspection system components.

The computer system 673 may be configured (e.g., with programming instructions) to provide a user interface (e.g., a computer screen) for displaying resultant intensity values, images, and other inspection results, such as CD bias values and maps. The computer system 673 may be configured to analyze intensity changes, phase, CDU maps, and/or other characteristics of reflected and/or transmitted sensed light beam. The computer system 673 may be configured (e.g., with programming instructions) to provide a user interface (e.g., on a computer screen) for displaying resultant intensity values, images, and other inspection characteristics. In certain embodiments, the computer system 673 is configured to carry out inspection techniques detailed above Because such information and program instructions may be implemented on a specially configured computer system, such a system includes program instructions/computer code for performing various operations described herein that can be stored on a computer readable media. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

In certain embodiments, a system for inspecting a photomask includes at least one memory and at least one processor that are configured to perform techniques described herein. One example of an inspection system includes a specially configured TeraScan™ DUV inspection system available from KLA-Tencor of Milpitas, Calif.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A method of measuring a critical dimension bias on a reticle, the method comprising:
   inspecting the reticle with an imaging system to obtain a measured image of a structure on the reticle, wherein the structure has an unknown critical dimension value;
   using a model, generating a calculated image using a design database that describes a pattern that was used to form the structure on the reticle for which the measured image was obtained, wherein the model generates the calculated image based on: optical properties of reticle materials corresponding to the structure, a computational model of the imaging system, and an adjustable critical dimension;
   minimizing a norm of a difference between the measured and calculated images by adjusting the adjustable critical dimension and iteratively repeating the operation of generating a calculated image so as to result in a final model critical dimension, wherein minimizing the norm of the difference is performed simultaneously with respect to the adjustable critical dimension and one or more uncertain parameters of the imaging system; and
   defining the unknown critical dimension value as the final critical dimension that resulted in a minimization of the norm of the difference.

2. The method of claim 1, wherein the measured image is comprised of a plurality of intensity values at a plurality of xy locations that correspond to a same plurality of xy locations of the calculated image.

3. The method of claim 2, wherein the measured image comprises a plurality of measured images of the structure obtained for a plurality of views for different operating parameters of the inspection tool, and the calculated image is generated to be comprised of a plurality of calculated images for the structure for the plurality of views.

4. The method of claim 3, wherein the views comprise reflected and transmitted light detection.

5. The method of claim 4, wherein the views comprise different settings for one or more of the following: focus offset, a pupil distribution of the illumination, a polarization state of the illumination, a numerical aperture of collection optics, an aperture shape, a pupil filter setting, or an analyzer setting.

6. The method of claim 1, wherein the computational model of the imaging system includes aberration characteristics that were measured on the imaging system.

7. The method of claim 1, wherein the norm of the difference that is minimized is:

$$\min_{CD,p} \sum_v \sum_x \sum_y (I_{calc}(x, y, v, CD, p) - I_{meas}(x, y, v))^2 w(x, y, v),$$

wherein:
   $I_{calc}$ (x,y,v,CD,p) is a plurality of intensity values of the calculated image as a function of x,y position, view v, critical dimension CD, and one or more unknown imaging system parameters p;
   $I_{meas}$ (x,y,v) is a plurality of intensity values of the measured image as a function of x,y position and view v, and
   w(x,y,v) is a plurality of weights as a function of x,y position and view v.

8. The method according to claim 1, wherein the norm of the difference between the measured and calculated images is a sum of squares of differences of measured and calculated image pixel values.

9. A method according to claim 1, wherein the norm of the difference between the measured and calculated images is a sum of absolute values of differences of measured and calculated image pixel values.

10. A method according to claim 1, wherein the one or more uncertain parameters of the system includes one or more of: focus and illumination intensity.

11. A method according to claim 1, wherein the measured and calculated images each comprise a set of images acquired at multiple views, two views differing by at least one or more imaging parameters that include a reflection or transmission mode, an illumination pupil distribution, an illumination polarization, a collection pupil numerical aperture and shape, a focus setting, and a pupil filter phase and amplitude.

12. The method of claim 1, wherein the norm of the difference that is minimized is:

$$\min_{CD,p} \left\{ \sum_v \sum_x \sum_y \frac{(I_{calc}(x, y, v, CD, p) - I_{meas}(x, y, v))^2}{\sigma^2(x, y, v)} + \sum_i \frac{(p_i - E(p_i))^2}{\sigma^2(p_i)} \right\},$$

wherein:
   $I_{calc}$ (x,y,v,CD,p) is a plurality of intensity values of the calculated image as a function of x,y position, view v, critical dimension CD, and one or more unknown imaging system parameters p;
   $I_{meas}$ (x,y,v) is a plurality of intensity values of the measured image as a function of x,y position and view v;
   $\sigma$(x,y,v) is the uncertainty in the intensity measurement at pixel(x,y) in view v;
   $p_i$ is an $i^{th}$ uncertain parameter of the imaging system;
   $E(p_i)$ is the expected value of $p_i$; and
   $\sigma(p_i)$ is the uncertainty in $p_i$.

13. The method of claim 1, further comprising:
   for a plurality of structures across the reticle, repeating the operations of inspecting, generating a calculated image, minimizing a norm, and defining the unknown critical dimension for each of the plurality of structures to obtain a plurality of final critical dimensions for the plurality of structures across the reticle thereby generating a critical dimension uniformity (CDU) map; and
   analyzing the CDU map to determine whether the reticle is defective and is to be repaired or discarded, or whether the reticle is to be used to fabricate a semiconductor wafer.

14. An inspection system for measuring a critical dimension bias on a reticle, the system comprising:
   illumination optics for generating and directing an incident beam towards the reticle;
   output optics for detecting images from the reticle in response to the incident beam; and
   at least one memory and at least one processor that are configured to initiate the following operations:

inspecting the reticle with the inspection system to obtain a measured image of a structure on the reticle, wherein the structure has an unknown critical dimension value;

using a model, generating a calculated image using a design database that describes a pattern that was used to form the structure on the reticle for which the measured image was obtained, wherein the model generates the calculated image based on: optical properties of reticle materials corresponding to the structure, a computational model of the imaging system, and an adjustable critical dimension;

minimizing a norm of a difference between the measured and calculated images by adjusting the adjustable critical dimension and iteratively repeating the operation of generating a calculated image so as to result in a final model critical dimension, wherein minimizing the norm of the difference is performed simultaneously with respect to the adjustable critical dimension and one or more uncertain parameters of the imaging system; and defining the unknown critical dimension value as the final critical dimension that resulted in a minimization of the norm of the difference.

15. The system of claim 14, wherein the measured image is comprised of a plurality of intensity values at a plurality of xy locations that correspond to a same plurality of xy locations of the calculated image.

16. The system of claim 15, wherein the measured image comprises a plurality of measured images of the structure obtained for a plurality of views for different operating parameters of the inspection tool, and the calculated image is generated to be comprised of a plurality of calculated images for the structure for the plurality of views.

17. The system of claim 16, wherein the views comprise two or more of the following: reflected and transmitted light detection, different settings for one or more of the following: focus offset, a pupil distribution of the illumination, a polarization state of the illumination, a numerical aperture of collection optics, an aperture shape, a pupil filter setting, or an analyzer setting.

18. The system of claim 14, wherein the computational model of the imaging system includes aberration characteristics that were measured on the imaging system.

19. The system according to claim 14, wherein the norm of the difference between the measured and calculated images is a sum of squares of differences of measured and calculated image pixel values.

20. A system according to claim 14, wherein the one or more uncertain parameters of the system includes one or more of: focus and illumination intensity.

21. A system according to claim 14, wherein the measured and calculated images each comprise a set of images acquired at multiple views, two views differing by at least one or more imaging parameters that include a reflection or transmission mode, an illumination pupil distribution, an illumination polarization, a collection pupil numerical aperture and shape, a focus setting, and a pupil filter phase and amplitude.

22. The system of claim 14, further comprising:
for a plurality of structures across the reticle, repeating the operations of inspecting, generating a calculated image, minimizing a norm, and defining the unknown critical dimension for each of the plurality of structures to obtain a plurality of final critical dimensions for the plurality of structures across the reticle thereby generating a critical dimension uniformity (CDU) map; and
analyzing the CDU map to determine whether the reticle is defective and is to be repaired or discarded, or whether the reticle is to be used to fabricate a semiconductor wafer.

23. A computer readable medium having instruction stored thereon for performing the following operations:
inspecting the reticle with an imaging system to obtain a measured image of a structure on the reticle, wherein the structure has an unknown critical dimension value;
using a model, generating a calculated image using a design database that describes a pattern that was used to form the structure on the reticle for which the measured image was obtained, wherein the model generates the calculated image based on optical properties of reticle materials corresponding to the structure, a computational model of the imaging system, and an adjustable critical dimension;
minimizing a norm of a difference between the measured and calculated images by adjusting the adjustable critical dimension and iteratively repeating the operation of generating a calculated image so as to result in a final model critical dimension, wherein minimizing the norm of the difference is performed simultaneously with respect to the adjustable critical dimension and one or more uncertain parameters of the imaging system; and
defining the unknown critical dimension value as the final critical dimension that resulted in a minimization of the norm of the difference.

* * * * *